United States Patent
Ortmüller et al.

(10) Patent No.: US 6,769,700 B2
(45) Date of Patent: Aug. 3, 2004

(54) SEALING SYSTEM FOR VEHICLE WINDOW PANES

(75) Inventors: Michael Ortmüller, Dautphetal-Herzhausen (DE); Günter Gründel, Biedenkopf-Dexbach (DE)

(73) Assignee: Elkamet Kunststofftechnik GmbH, Biedenkopf (DE)

(*) Notice: Subject to any disclaimer, the term of this patent is extended or adjusted under 35 U.S.C. 154(b) by 0 days.

(21) Appl. No.: 10/221,140
(22) PCT Filed: May 9, 2001
(86) PCT No.: PCT/EP01/05290
§ 371 (c)(1), (2), (4) Date: Sep. 10, 2002
(87) PCT Pub. No.: WO01/85481
PCT Pub. Date: Nov. 15, 2001

(65) Prior Publication Data
US 2003/0057660 A1 Mar. 27, 2003

(30) Foreign Application Priority Data
May 12, 2000 (DE) .......................... 200 08 555

(51) Int. Cl.$^7$ ................................. B60J 10/02
(52) U.S. Cl. ................ 277/642; 277/644; 277/650; 277/921; 296/93; 49/490.1
(58) Field of Search ................ 277/637, 641, 277/642, 644, 647, 921, 650, 651; 296/93; 49/477.1, 490.1

(56) References Cited

U.S. PATENT DOCUMENTS

| | | | |
|---|---|---|---|
| 4,219,230 A | | 8/1980 | Lapine |
| 4,546,986 A | | 10/1985 | Roselli |
| 4,930,790 A | * | 6/1990 | Sheridan ............... 277/630 |
| 5,001,876 A | * | 3/1991 | Harper et al. ........... 52/208 |
| 5,112,101 A | * | 5/1992 | Katcherian et al. ........ 296/201 |
| 5,248,179 A | * | 9/1993 | Biermacher et al. ..... 296/146.15 |
| 5,311,711 A | * | 5/1994 | Desir, Sr. ............... 52/208 |
| 5,603,546 A | * | 2/1997 | Desir, Sr. ............... 296/93 |
| 5,935,356 A | | 8/1999 | Soldner |
| 6,287,402 B2 | * | 9/2001 | Soldner ................. 156/71 |

FOREIGN PATENT DOCUMENTS

| | | |
|---|---|---|
| DE | 3606566 | 9/1987 |
| DE | 3702555 | 8/1988 |
| DE | 68911385 T2 | 5/1989 |
| DE | 9113392.0 | 10/1991 |
| DE | 4141813 | 6/1993 |
| DE | 19648330 | 5/1998 |
| DE | 19902232 | 7/2000 |
| EP | 0945296 | 9/1999 |
| FR | 2754503 | 4/1998 |
| GB | 2093106 | 2/1982 |

\* cited by examiner

*Primary Examiner*—Alison K. Pickard
(74) *Attorney, Agent, or Firm*—Clark & Brody

(57) ABSTRACT

A sealing assembly for vehicle windscreens (10) comprises a profiled element (20) to be attached to a lower marginal area (12) of the windscreen. A spring member (25) serves for sealed locking engagement with a snapper fin (16) of a water box cover (14) and has a sealing lip (30), fitting between the bottom edge (13) of the windscreen and the upper edge (18) of the water box cover (14). The sealing lip 30 is substantially flush with external surfaces A and G and is bonded to, or integral with, an inclined surface (22) that projects outwardly from a supporting or wedge-shaped rib (21) and has a resiliently deformable, preferably wedge-shaped curved element which is clamped between, and supported by, the bottom edge (12) of the windscreen and the fin (16). The profiled element (20) and/or the sealing lip (30) can be composite elements which are soft on the outside and hard on the inside. Stiffeners 26 and 26' increase the elasticity. A bearing surface (23) of the profiled element (20) has staggered or vertically spaced contact regions (38) between which an adhesive layer 36 engages a surface section (33), for example, an adhesive tape (36) disposed flush in a recess (34) and perforated if desired.

21 Claims, 5 Drawing Sheets

SEALING SYSTEM FOR VEHICLE WINDOW PANES

FIELD OF THE INVENTION

The invention relates to a sealing assembly for vehicle windscreens.

BACKGROUND ART

DE 3 606 566 C2 describes a mount for the windscreen of a motor vehicle, which mount comprises a split frame that releasably grips the windscreen on its inside and outside surfaces. There are also U-shaped profiles which clasp the lower edge of the pane and exhibit or form a catch-ridge for a water box cover disposed thereunder. The usual practice is to cement the U-shaped profile or a cranked section strip, e.g., as specified in DE 68 911 385 T2, to the windscreen from the back (inside) by means of an adhesive string, e.g., a polyurethane string, in order to create a permanent bond therewith.

To prevent the windscreen wipers from sweeping beyond the lower outer limb of the profiled frame, they are conventionally arranged such that their position of rest is in the lower region of the windscreen above the profile. This impairs, inter alia, the air resistance coefficient that is proportional to the square of the speed of the vehicle whereby the fuel consumption rises considerably, particularly during travel at high speed. In addition, the noise level is also influenced.

It is therefore desirable to place the windscreen wiper at a lower position. As it is imperative to have a sealed transition between the lower edge of the windscreen and the water box cover, it is necessary to ensure that the wipers operate without incurring damage.

SUMMARY OF THE INVENTION

It is an object of the invention to provide an improved sealing assembly for vehicle windscreens in a very simple and economical manner whilst overcoming the drawbacks of the prior art. It is another objective to provide for accommodation of windscreen wiper equipment that is displaceable up and down while allowing acess to the lid or cover of a water box located below.

In a sealing assembly for vehicle windscreens, particularly for the lower region of a motor vehicle windscreen, comprising a profiled element for attachment to a lower margin of said windscreen via a bearing surface, which profiled element has, in cross-section, the form of a hook and comprises a spring-loaded limb optionally provided with a resilient reinforcement, said limb being adapted to sealingly lock with a recessed fin of a water box cover, the invention provides that the profiled element comprises at least one sealing lip adapted to fit between the bottom edge of the windscreen and the upper edge of the water box cover with whose external surfaces said lip is substantially flush. This makes it possible for the windscreen wipers to be parked in an idling position beyond the bottom edge of the windscreen below the hood of the vehicle, where they rest on the water box cover. The latter can be removed in the usual manner, for example in order to change a pollen filter. As the sealing lip is flush with said external surfaces, the windscreen wipers can move freely. When switched off, they park in said lower position, whereas they stay on the windscreen during use, of course, whether switched to continuous or to intermittent operation. The profiled element is firmly fixed to the windscreen only from the inside or rear.

Particularly advantageous is an embodiment wherein the sealing lip forms or comprises an at least partially flexibly deformable body shaped to at least in partially have a wedge or cuboid—like cross- section. For example, it comprises or exhibits an extruded flat profiled element, a closed-cell foam wedge or the like. This design provides particularly good compensation for tolerances between the bottom edge of the windscreen and the water box cover.

In another aspect of the invention, the sealing lip extends from the profiled element at an angle thereto, in particular protruding outwardly therefrom below the substantially plane bearing surface. Owing to this design, the bottom edge of the windscreen is gripped in snug fit from the rear, i.e. from below. To further assist the snug fit, the sealing lip comprises at least one separate curved or nose-shaped edge whereby an optimal and constant sealing action is attained.

In another embodiment the profiled element and/or the sealing lip consist of one or more parts, the profiled element and/or the sealing lip comprising a combination of materials, specifically in the form of a composite element of soft and hard materials. For example, the sealing lip can have a soft outside and a hard inside; in particular, it can be solid or hard and hollow inside but soft on the outside. Other variants are possible, too; for example, the sealing lip may be an integral resilient element adhesively attached to the more rigid profiled element which in turn may have a highly elastic core.

The profiled element can have a wedge-shaped or supporting rib which forms a resilient clamping and/or bracing element between the lower edge of the windscreen and the recessed fin of the water box cover. The sealing lip is thus always firmly held from the inside, and the clamping or bracing element contributes greatly to the overall sealing effect and to general stability.

The supporting rib can be substantially wedge-shaped, T-shaped or U-shaped, depending on the bracing or supporting effect required. Furthermore, the supporting rib can exhibit a plane and/or curved surface, with which inner surfaces of the sealing lip are integral or are firmly bonded thereto.

Additional stability within the profiled element can be provided by an embodiment whereby the wedge-shaped or supporting rib comprises a resilient reinforcement or stiffener so that the overall profile is permanently stable and capable of absorbing extremely high loads. The sealing effect can be further optimized if the surface of the wedge-shaped or supporting rib carries at least one further sealing lip that bears tightly against the motor vehicle windscreen or the water box cover The sealing lips can be bonded to each other or forming a single unit.

It is particularly advantageous if the bearing surface of the profiled element bears against the windscreen over at least one section of a supporting or adhering layer. The supporting element can have or form an element which is at least in part flexibly deformable. This feature ensures that the profiled element is permanently fixed to the windscreen, which assists mounting the windscreen to the vehicle. In another embodiment means of attaching the profiled element can be made economically, in that the supporting or adhering layer is self-adhesive and/or perforated, which contributes to overall stability and rigidity.

The bearing surface of the profiled element can exhibit vertically spaced contact regions between which the supporting or adhering layer is enclosed.

In another mode, a portion of the surface can extend inwardly away from the windscreen, preferably by way of a flat recess with which an adhesive tape is in snug contact. The bearing surface of the profiled element may be perforated in the at least one surface section, specifically with at least one row of holes. Adhesive applied to the rear of the unit can thus reach the windscreen without any difficulty. If necessary, an additional adhesive bond at the upper edge of the profiled element can provide further means for its fixation.

In another embodiment, the rear of the profiled element has, for its support against a vehicle body part, at least one supporting rib and/or a buffer strip which may be integral with the profiled element. It is structurally advantageous if at least one supporting rib carries said buffer strip.

Additionally or alternatively, the profiled element can include a nose-shaped extension or an undercut at its upper limb end. This provides for additional and particularly strong anchorage of the profiled element on the windscreen.

BRIEF DESCRIPTION OF THE DRAWINGS

Further features, details and advantages of the invention will be gathered from the wording of the claims and from the following description of embodiments with reference to the drawings, in which:

DESCRIPTION OF THE PREFERRED EMBODIMENTS

Figure 1:
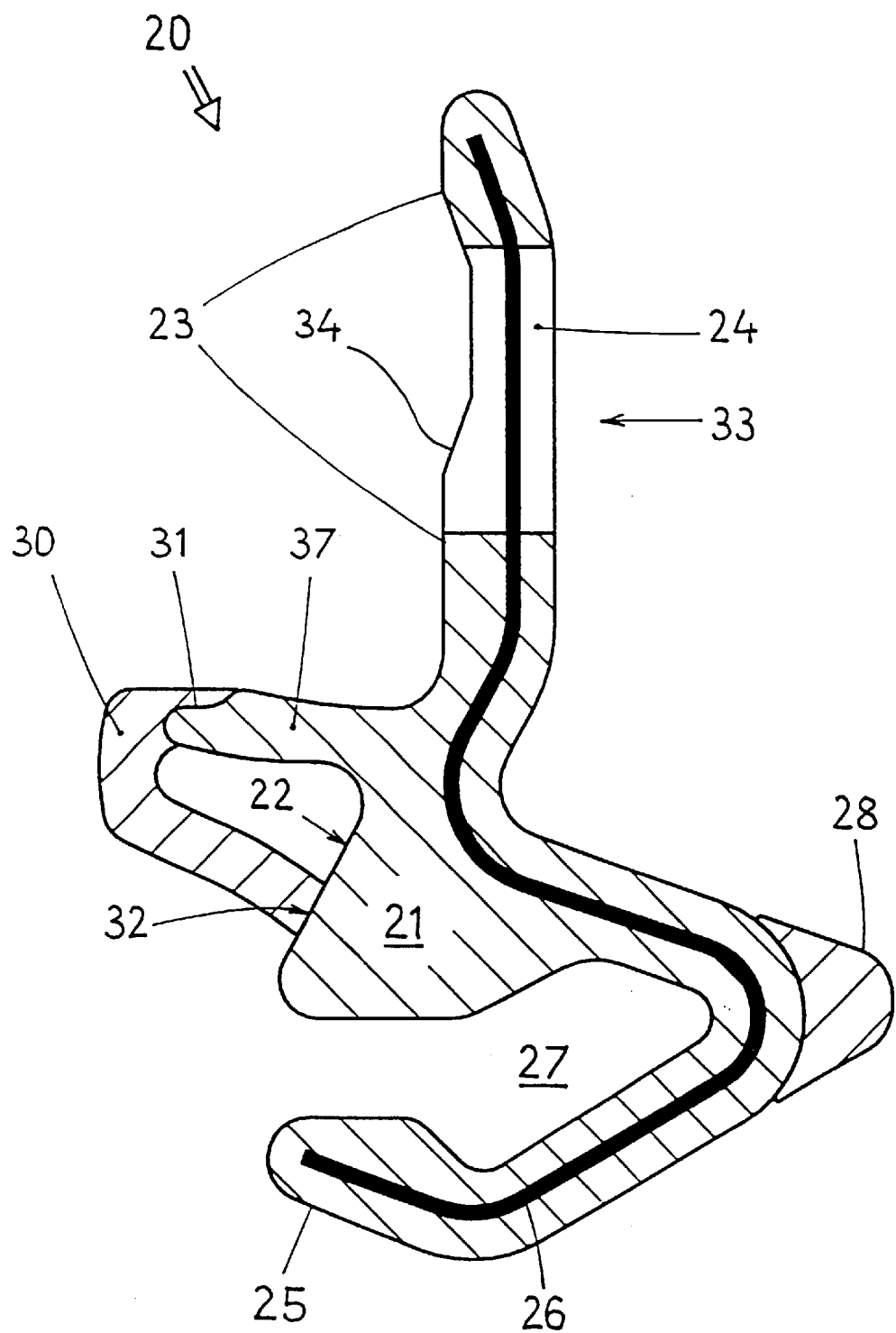
FIG. 1 is a cross-sectional view of a profiled element.

FIG. 1 shows a greatly enlarged cross-section of a profiled element 20 comprising in its central region a supporting rib 21 that has an inclined surface 22 above which there is a split bearing surface 23. The profiled element 20 consists of one or more plastics materials of suitable hardnesses, for example, polypropylene (PP), polyvinyl chloride (PVC), acrylonitrile/butadiene/styrene copolymers (ABS) or the like and/or combinations thereof. It may comprise a reinforcement or stiffener 26 to resiliently brace a spring member 25 in its lower region. The material of the stiffener 26 can be an aluminum or steel strip of, say, from 0.2 mm to 0.4 mm in thickness. At a bend between the central region and a lower region there is provided a buffer strip 28 of softer material.

At the front of the profiled element 20 (on the left in FIG. 1), the wedge-shaped supporting rib 21 has an inclined surface 22 from which a hollow sealing lip 30 extends transversely. It can be anchored to the inclined surface 22 on at least one inner surface 32. In the example shown in FIG. 1, the top portion of the sealing lip 30 overlaps a projection 37 which extends forewardly or outwardly from the middle portion of the wedge-shaped rib 21. In this way, a hard/soft interface 31 is provided at which materials of different kinds or hardnesses form a single unit or are interconnected integrally.

Figure 2:
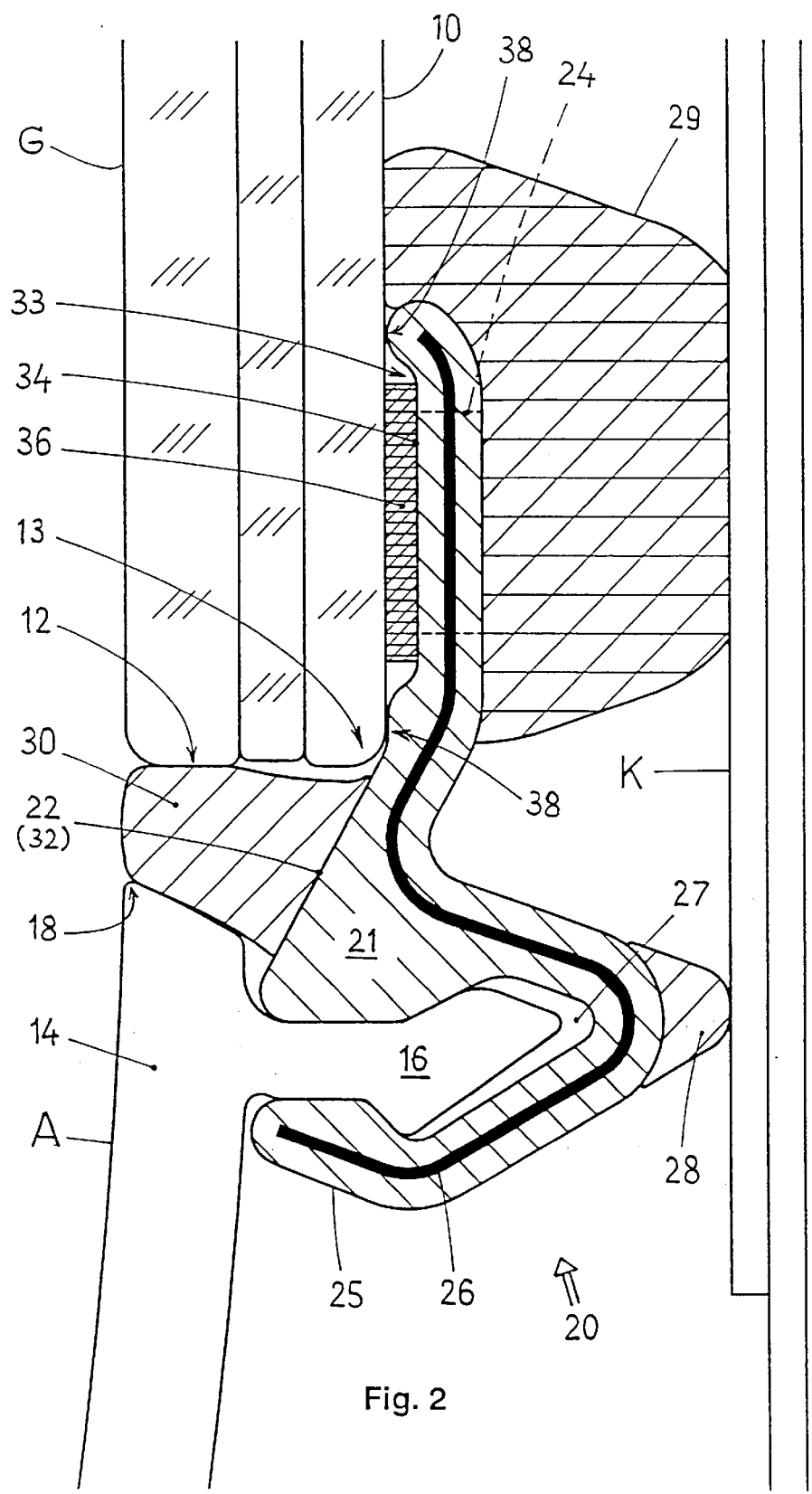
FIG. 2 is a diagrammatic cross-sectional view of the mounted profiled element of FIG. 1.

The installed sealing assembly is shown in FIG. 2. A windscreen 10 is, at its bottom edge 12, in frictional and form-fitting contact with the sealing lip 30. In this example, the sealing lip 30 is a solid body of soft material whose underside bears snugly against the upper surface 18 of a water box cover 14. The soft material is preferably a thermoplastic elastomer (TPE), a microcellular rubber or some other suitable material.

By contrast to the version drawn, however, the sealing lip 30 may again be hollow (as illustrated in FIG. 1). It will be seen that the external surface G of the windscreen 10 is substantially flush with the outer part of the sealing lip 30 and the external surface A of the water box cover 14.

The profiled element 20 is fixed to the back of the windscreen 10 by means of an overlapping adhesive string 29 of which the inner surface bears flat against the vehicle body K. The profiled element 20, which in this embodiment is also bent hookwise, bears directly against the rear surface of the windscreen 10 by way of contact regions 38 above and below an intermediate surface section 33. Opposite the windscreen, at a small distance therefrom, there is a recess 34 in the intermediate surface section 33 which may be provided with perforation such as a row of holes 24 (FIG. 1). Two or more rows of holes 24 are likewise possible. Furthermore, shapes other than a circular hole (cf FIG. 3) are also suitable. Uncured adhesive will pass through the perforation 24 from the adhesive string 29 to the rear side of windscreen 10. In the embodiment shown in FIG. 2, a double-sided, optionally perforated adhesive tape 36 fills the recess 34 such that virtually the entire upper region of the profiled element 20 adheres flat against the rear side of windscreen 10.

The transition region from the upper to the middle region of the profiled element 20 forms a groove engaging the rear bottom edge 13 of the windscreen 10 from below. Whereas in the example of FIG. 2, the wedge-shaped rib 21 adjacent to this groove protrudes with its inclined surface 22 forwardly or outwardly, the underside of the wedge-shaped rib 21 extends rearwardly or inwardly by way of a bay 27 whose rearmost part is opposite to the buffer strip 28. From there spring member 25 extends, again projecting forwardly or outwardly. This part of the profiled element 20 clasps a fin 16 of water box cover 14, the component parts 16 and 21/25 being provided with undercuts that form snap-locking means. The reinforcement or stiffener 26 follows the general hook shape of profiled element 20, but may also be shorter than drawn.

Figure 3:
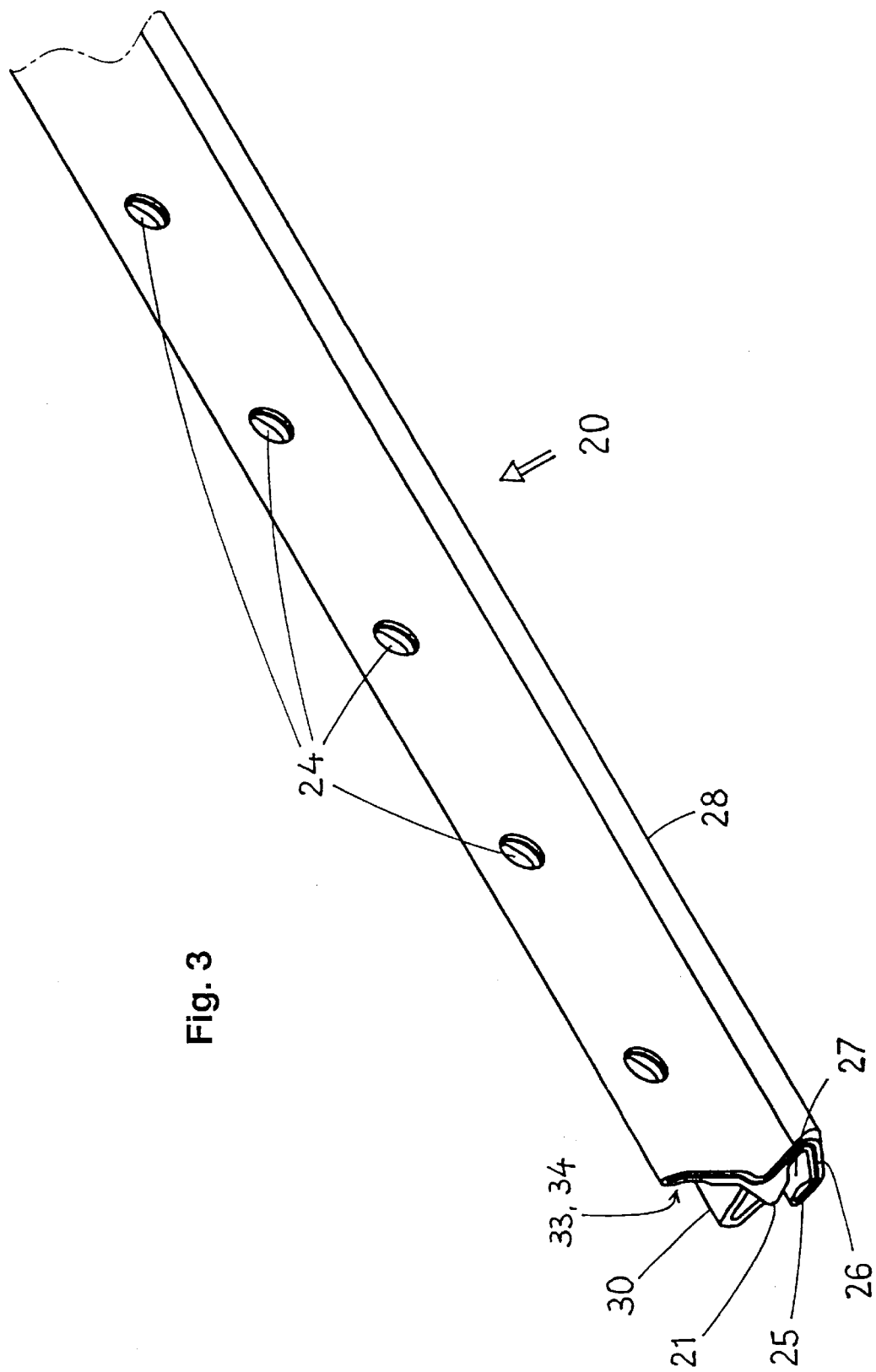
FIG. 3 is a perspective partial view of a perforated profiled element.

FIG. 3 illustrates the profiled element 20 as a whole. It is readily seen that it is a stable strip which is easy to handle. It can be readily shortened to the desired length and shaped to match the windscreen shape.

In another embodiment of profiled element 20 (FIG. 4), the supporting rib 21 is approximately T-shaped in cross-section. Between the lower edge 12 of the windscreen 10 and the snapping fin 16 of the water box cover 14, it forms a clamping or supporting member carrying, on a curved inclined surface 22, a wedge-shaped sealing lip 30 of soft material. The latter bears with its nose edge 39 frictionally and form-fitting against the bottom edge 13 of the windscreen 10 and is compressed between this and the upper surface 18 of the water box cover 14 in such a manner that the external surface of the sealing lip 30 is flush with the external surfaces G, A of the windscreen 10 and the water box cover 14, respectively. In the region of the fin 16, the inclined surface 22 forms a forwardly pointing step 35 adjoined by another sealing lip 40, which with its projecting nose edge 41 seals the profiled element 20 from water box cover 14. The sealing lip 30 and the other sealing lip 40 bear form-fitting against the inclined or curved surface 22 of the profiled element 20, being preferably integral with one another.

Figure 4:
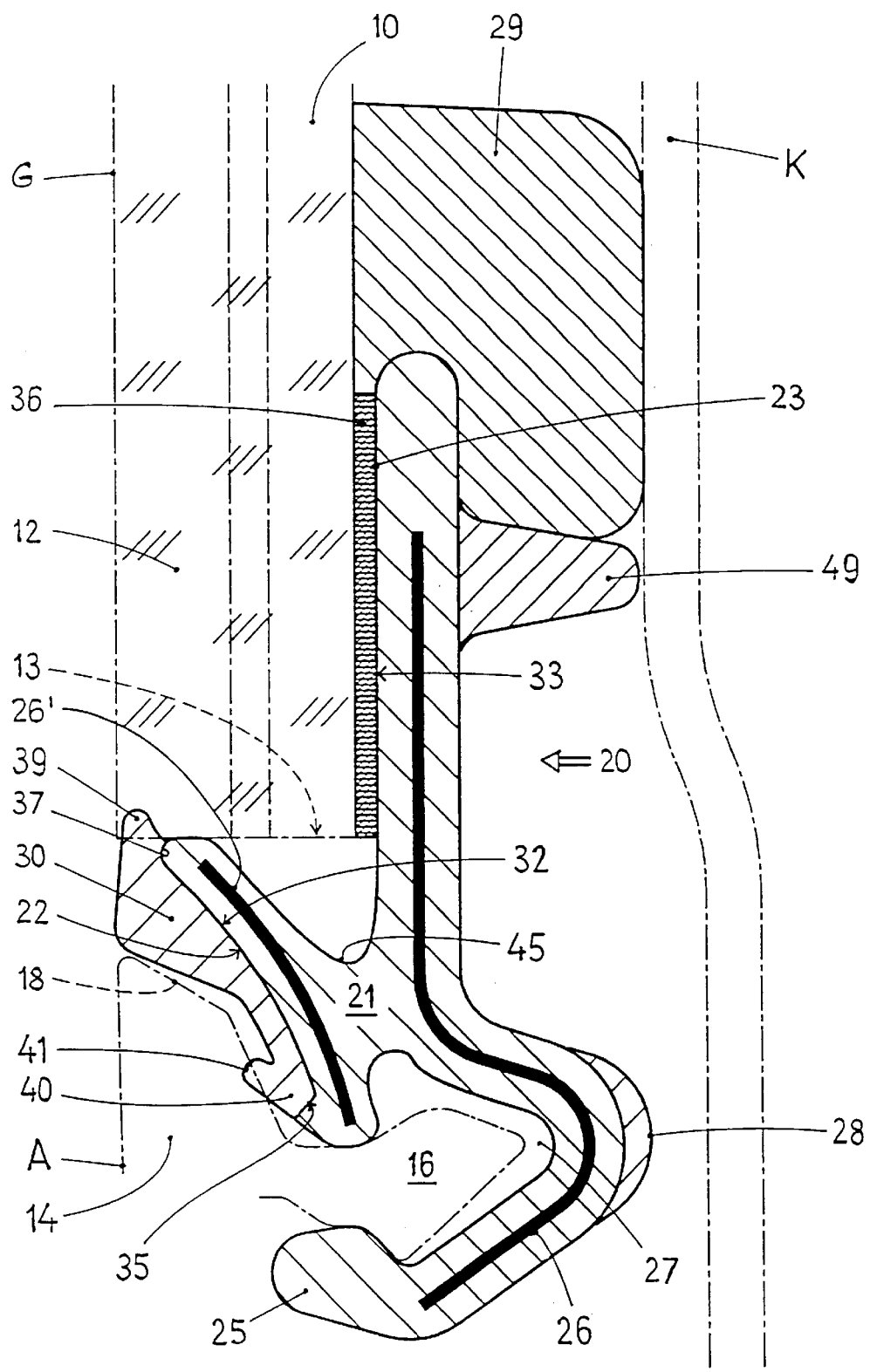
FIG. 4 is a diagrammatic cross-sectional view of another embodiment of a mounted profiled element and FIG. 5 shows a diagrammatic cross-sectional view of a yet another embodiment of a mounted profiled element.

It may be seen from FIG. 4 that the upper projection or arm 37 of the supporting rib 21 and the upper center area of the profiled element 20 form a cavity 45 by which means the projection 37 bearing against the windscreen 10 can yield resiliently. Thus the supporting rib 21 and the sealing lip 30 can easily compensate for tolerances between the windscreen 10 and water box cover 14. A reinforcement or stiffener 26 inside the T-shaped supporting rib 21 raises the stability of the profile 20 and the load-bearing strength of the projection or arm 37.

In the embodiment of FIG. 4, fixation of the profiled element 20 is effected at the rear of the windscreen 10 by means of a double-sided adhesive tape 36 applied to the entire plane bearing surface 23 of the profiled element 20. Furthermore, the end of the profiled element 20 is covered by an adhesive string 29 which in turn bears flat against the vehicle body K. Perforation holes 24 in the profiled element 20 and/or the adhesive tape 36, which may also be of soft material, ensure that uncured adhesive can pass from the adhesive string 29 to the rear of the windscreen 10 whereby greater stability is achieved. However, such holes 24 are not absolutely necessary.

Alternatively or as a supplementary measure, the limb of the profiled element 20 bearing against the windscreen—as in the embodiment of FIG. 2—may be provided with a recess 34 in which double-sided adhesive tape 36 is placed. In the region of the lower edge 12 of the windscreen 10, the profiled element 20 is braced at the rear against the vehicle body part K by a supporting rib 49. The support provided thereby absolutely suffices to warrant the required enduring stability. For this reason, the buffer strip 28 need not necessarily contact the vehicle body K; it may even be completely omitted, with the result that the profiled element 20 is held at a distance merely by the adhesive string 29.

Figure 5:
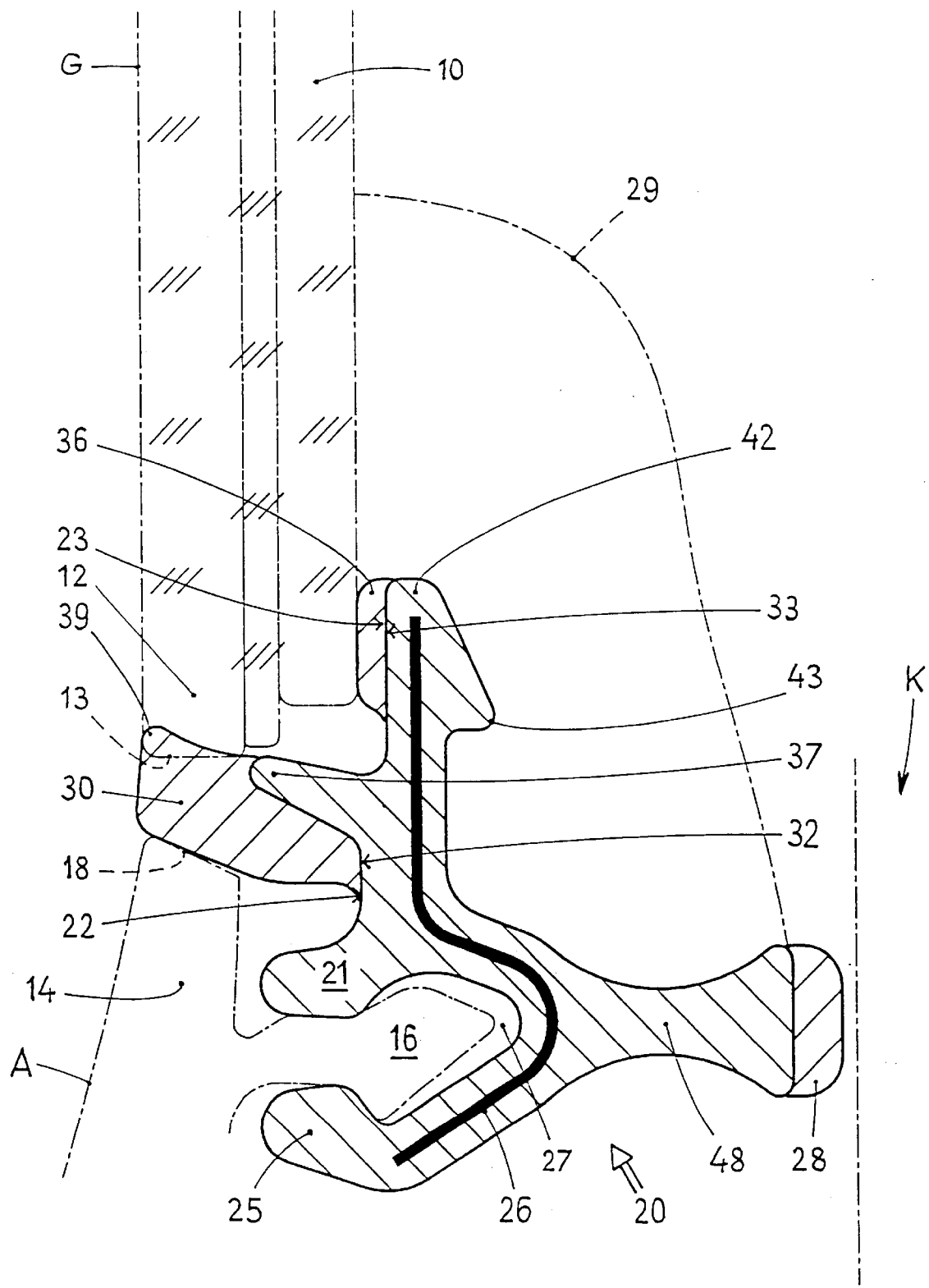

A more compact embodiment of a profiled element 20 is illustrated in FIG. 5. Here the overall shape of the supporting rib 21 is that of a U, and it also has a U-shaped surface 22. The sealing lip 30 is approximately cuboid and overlaps the projection 37 of the supporting element 21. This does not bear against the bottom edge 13 of the windscreen 10 so that tolerance compensation between windscreen 10 and water box 14 is afforded by the sealing lip 20 directly. Nose edge 39 provides a reliable seal, with the external surface of sealing lip 30 being flush the external surfaces G, A of windscreen 10 and water box 14.

That portion of the profiled element 20 which presses against the rear of the windscreen 10 by way of an optionally self-adherent soft pad 36 is distinctly shorter than in the other embodiments. Near its upper end 42 it is provided with an undercut or nose-shaped extension that is covered by an adhesive string 29 (indicated only), which extends over the rear of the profiled element 20 down to its lower region. There, preferably at approximately the level of the snapper fin 16, a supporting rib 48 is provided which causes the entire profiled element 20 to bear, via a buffer strip 28, against the vehicle body K with which the adhesive string 29 need not be in contact.

The invention is not restricted to any of the embodiments described above but can be modified in many ways. In particular, a great variety of combinations of materials for the sealing lip 30 and the profiled element 20 can be used over and above the embodiments described heretofore. Suitable materials are, for example, PP, PVC, PVC/ABS or other thermoplastically processable plastics materials.

To summarize, it may be stated that a preferred sealing assembly for vehicle windscreens 10 embodies a profiled element 20 for attachment to a bearing surface 23 near the lower edge 12 of the windscreen 10, which profiled element has, in cross-section, the shape of a hook and comprises a spring member 25. The latter is designed for sealed locking engagement with a snapper fin 16 of a water box cover 14 and has a sealing lip 30 which may fit between the bottom edge 13 of the windscreen 10 and the upper edge 18 of the water box cover 14 and which is substantially flush with their external surfaces A and G. The sealing lip 30 projects outwardly together with a supporting rib 21 which may be wedge-shaped, T-shaped or U-shaped so as to form a resilient clamping and supporting element between the bottom edge 12 of the windscreen 10 and the fin 16. At least one inner surface 32 of the sealing lip 30 is an integral part of, or is firmly bonded to, an inclined or shaped surface 22, which sealing lip 30 comprises or forms a deformable curved element that is in particular flexibly deformable and is preferably wedge-shaped or cuboid. The profiled element 20 and/or the sealing lip 30 can be of a combination of materials; for example they may form composite elements that are soft on the outside and hard on the inside. Stiffeners 26 and 26' increase the elasticity. Advantageously, the bearing surface 23 of the profiled element 20 has staggered contact regions 38 between which an optionally perforated surface section 33 may be provided with an adhesive layer, e.g. a double-sided adhesive tape 36, which may also be perforated and is located flush in a recess 34. Inwardly directed supporting ribs 48, 49 contribute to secure positioning and their buffer strip 28 serves for resilient interception of displacement loads.

All and any of the features and advantages disclosed in the claims, description and drawings, including structural details, arrangements and process steps, can be essential to the invention both independently and in a great variety of combinations.

LIST OF REFERENCE SYMBOLS

A External Surface (of 14)

G External Surface (of 10)

K Vehicle Body [Part]

10 windscreen
12 lower marginal area
13 bottom edge
14 water box cover
16 (snapper) fin
18 top edge
20 profiled element
21 supporting rib/wedge-shaped rib
22 (inclined) surface
23 bearing surface
24 row of holes
25 spring-loaded limb
26, 26' reinforcement/stiffener
27 bay
28 buffer strip
29 adhesive string
30 sealing lip
31 hard/soft interface
32 inner surfaces 33 surface section
34 recess
35 step
36 adhesive tape
37 projection
38 contact region
39 nose edge
40 further sealing lip
41 nose edge
42 upper end
43 undercut/extension
45 cavity
48, 49 supporting ribs

What is claimed is:

1. A sealing assembly for vehicle windscreens, particularly for the lower region of a motor vehicle windscreen (10), comprising a profiled element (20) having a hook shape in cross section a bearing surface (23) of the profiled element (20) forming an upper part of the hook shape for attachment to a lower margin (12) of said windscreen via said bearing surface (23), said profiled element (20) having a spring-loaded limb (25) as a lower part of the hook shape and optionally being provided with a resilient reinforcement (26), said limb (25) being adapted to sealing lock with a recessed fin (16) of a water box cover (14), wherein the profiled element (20) comprises at least one sealing lip (30) extending from a middle part of the hook-shaped profile element (20) and being adapted to fit between a bottom edge (13) of the windscreen (10) and an upper edge (18) of the water box cover (14) with whose external surfaces (A, G) said lip (30) is substantially flush.

2. A sealing assembly according to claim 1, wherein the sealing lip (30) comprises an at least partially flexibly deformable body shaped to at least partially have a wedge or cuboid like cross-section.

3. A sealing assembly according to claim 1, wherein the sealing lip (30) extends from the profiled element (20) at an angle thereto, in particular protruding outwardly therefrom below the substantially plane bearing surface (23).

4. A sealing assembly according to claim 1, wherein the sealing lip (30) comprises at least one separate curved or nose-shaped edge (39:41).

5. A sealing assembly according to claim 1, wherein the profiled element (20) and/or the sealing lip (30) consist of one or more parts, the profiled element (20) and/or the sealing lip (30) comprising a combination of materials specifically in the form of a compound of soft and hard materials.

6. A sealing assembly according to claim 1, wherein the profiled element (20) has a wedge-shaped or supporting rib (21) which forms a resilient clamping and/or bracing element between the lower margin (12) of the windscreen (10) and the recessed fin (16) of the water box cover (14).

7. A sealing assembly according to claim 6, wherein the supporting rib (21) is substantially wedge-shaped, T-shaped or U-shaped.

8. A sealing assembly according to claim 6, wherein the wedge-shaped or supporting rib (21) is provided with a resilient reinforcement (26').

9. A sealing assembly according to claim 6, wherein the wedge-shaped or supporting rib (21) includes a plane and/or curved surface (22) with which inner surfaces (32) of the sealing lip (30) are integral or are firmly bonded thereto.

10. A sealing assembly according to claim 9, wherein the surface (22) of the wedge-shaped or supporting rib (21) carries at least one further sealing lip (40) which bears tightly against the motor vehicle windscreen (10) or the water box cover (14).

11. A sealing assembly according to claim 10, wherein the sealing lips (30, 40) are bonded to each other or form an integral unit.

12. A sealing assembly according to claim 1, wherein the bearing surface (23) of the profiled element (20) bears against the windscreen (10) over at least one section (33) of a supporting or adhering layer (36).

13. A sealing assembly according to claim 12, wherein the supporting or adhering layer (36) has or forms an element which is at least in part flexibly deformable.

14. A sealing assembly according to claim 12, wherein the supporting or adhering layer (36) is self-adhesive and/or perforated.

15. A sealing assembly according to claim 12, wherein the bearing surface (23) of the profiled element (20) exhibits vertically spaced contact regions (38) between which the supporting or adhering layer (36) is enclosed.

16. A sealing assembly according to claim 12, wherein a portion (33) of the surface extends inwardly away from the windscreen (10), preferably by way of a flat recess (34) with which an adhesive tape (36) is in snug contact.

17. A sealing assembly according to claim 12, wherein the bearing surface (23) of the profiled element (20) is perforated in the at least one surface section (33), specifically with at least one row of holes (24).

18. A sealing assembly according to claim 1, wherein the rear of the profiled element (20) has at least one supporting rib (48, 49) and/or buffer strip (28) for support thereof against a vehicle body part (K).

19. A sealing assembly according to claim 18, wherein the at least one supporting rib (48; 49) is integral with the profiled element (20).

20. A sealing assembly according to claim 19, wherein at least one supporting rib (48) carries said buffer strip (28).

21. A sealing assembly according to claim 1, wherein the profiled element (20) is provided at its upper limb end (42) with a nose-shaped extension (43) or with an undercut.

* * * * *